United States Patent
Lee et al.

(10) Patent No.: US 10,935,110 B2
(45) Date of Patent: Mar. 2, 2021

(54) AUTOMATIC TRANSMISSION FOR VEHICLE

(71) Applicants: HYUNDAI MOTOR COMPANY, Seoul (KR); KIA MOTORS CORPORATION, Seoul (KR)

(72) Inventors: Kang Hoon Lee, Goyang-si (KR); Sung Hoon Park, Seongnam-si (KR); Jae Young Jeon, Osan-si (KR); Won Seok Oh, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 191 days.

(21) Appl. No.: 16/201,572

(22) Filed: Nov. 27, 2018

(65) Prior Publication Data
US 2020/0103004 A1    Apr. 2, 2020

(30) Foreign Application Priority Data
Sep. 28, 2018 (KR) .......................... 10-2018-0116207

(51) Int. Cl.
*F16H 3/62* (2006.01)
(52) U.S. Cl.
CPC ....... *F16H 3/62* (2013.01); *F16H 2200/0069* (2013.01); *F16H 2200/201* (2013.01); *F16H 2200/2048* (2013.01)

(58) Field of Classification Search
CPC ....................................................... F16H 3/62
See application file for complete search history.

(56) References Cited

U.S. PATENT DOCUMENTS 8,029,405 B2 * 10/2011 Kim ....................... F16H 3/663
475/280

FOREIGN PATENT DOCUMENTS

KR    10-2017-0108440 A    9/2017

\* cited by examiner

*Primary Examiner* — Derek D Knight
(74) *Attorney, Agent, or Firm* — Brinks Gilson & Lione

(57) ABSTRACT

An automatic transmission includes: first, second, and third planetary gear sets each having three rotating elements; seven coupling elements variably providing a frictional force; and seven shafts. In particular, a first shaft is fixedly connected to a second rotating element of the third planetary gear set and an input shaft, a third shaft is fixedly connected to a third rotating element of the second planetary gear set, a fourth shaft is fixedly connected to a first rotating element of the second planetary gear set and a third rotating element of the third planetary gear set, a sixth shaft is directly connected to a first rotating element of the third planetary gear set and a transmission casing, a seventh shaft is fixedly connected to a third rotating element of the first planetary gear set and an output shaft, and remaining two shafts are selectively fixed to the transmission casing.

13 Claims, 6 Drawing Sheets

| Gear stage | CL1 | CL2 | CL3 | F1 | F2 | B1 | B2 | Gear ratio |
|---|---|---|---|---|---|---|---|---|
| 1th | | | | ● (LOCK) | ○ (OWC1) | ● | | 4.706 |
| 2th | | | ● | ○ (FREE) | ● (OWC1) | | | 3.704 |
| 3th | | | | ● (OWC1) | ○ (OWC1) | | ● | 2.902 |
| 4th | | ● | | ● (LOCK) | ○ (FREE) | | | 1.864 |
| 5th | | | ● | ● (LOCK) | ○ (FREE) | | | 1.424 |
| 6th | ● | | | ● (LOCK) | ○ (OWC2) | | | 1.225 |
| 7th | | | | ○ (FREE) | ● (OWC2) | | ● | 1.183 |
| 8th | ● | | ● | ○ (FREE) | ○ (OWC2) | | | 1.000 |
| 9th | ● | ● | | ○ (FREE) | ○ (FREE) | | | 0.790 |
| 10th | ● | | | ○ (FREE) | ○ (FREE) | | ● | 0.635 |
| REV | | ● | | ○ (FREE) | ○ (OWC1) | ● | | −3.239 |

First gear stage

Second gear stage

Third gear stage

Fourth gear stage

Fifth gear stage

Sixth gear stage

Seventh gear stage

Eighth gear stage

Ninth gear stage

Tenth gear stage

AUTOMATIC TRANSMISSION FOR VEHICLE

CROSS REFERENCE TO RELATED APPLICATION

This application claims priority to and the benefit of Korean Patent Application No. 10-2018-0116207, filed Sep. 28, 2018, the entire contents of which are incorporated herein by reference.

FIELD

The present disclosure relates generally to an automatic transmission for a vehicle, more particularly, to a transmission structure.

BACKGROUND

The statements in this section merely provide background information related to the present disclosure and may not constitute prior art.

A multistage transmission enhances fuel efficiency of a vehicle by enabling an engine to operate in a more efficient region over the entire travel region of the vehicle, and is intended to improve the drivability of the vehicle by promptly providing a gear ratio that is more suitable for the driver's request.

Further, in realizing the multistage transmission properly, it is desired to reduce the size and weight of the transmission by minimizing the number of components as much as possible in order to improve vehicle mountability, reduce cost, and improve fuel economy of a vehicle.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose an automatic transmission for a vehicle, in which ten forward and one reverse gear stages are provided to enable an engine to operate in a more efficient region over the entire travel region of a vehicle, thereby enhancing fuel efficiency of the vehicle, a gear ratio that is more suitable for the driver's request is promptly provided to improve the drivability of the vehicle, and the number of components is minimized or reduced as much as possible to reduce the size and weight of the transmission, thereby improving vehicle mountability, reducing cost, and improving fuel economy of the vehicle.

In one form of the present disclosure, an automatic transmission for a vehicle includes: an input shaft receiving power; an output shaft outputting power; a first planetary gear set having first, second, and third rotating elements; a second planetary gear set having fourth, fifth, and sixth rotating elements; a third planetary gear set having seventh, eighth, and ninth rotating elements; a first shaft connected to the eighth rotating element and the input shaft; a second shaft connected to the second rotating element and the fifth rotating element; a third shaft connected to the sixth rotating element; a fourth shaft connected to the fourth rotating element and the ninth rotating element; a fifth shaft connected to the first rotating element; a sixth shaft connected to the seventh rotating element; and a seventh shaft connected to the third rotating element and the output shaft.

The automatic transmission may further include seven coupling elements selectively connecting a pair of shafts among the first to the seventh shafts, or selectively connecting a shaft among the first to seventh shafts to a transmission casing. Two coupling elements of the seven coupling elements are controlled to be simultaneously operated, such that a predetermined gear stage of forward and reverse gear stages is implemented.

The seven coupling elements may include: five clutches connecting the pair of shafts of the first to the seventh shafts together; and two brakes selectively connecting shafts of the first to the seventh shafts without being connected to the input shaft or the output shaft, with the transmission casing.

The seven coupling elements may include: a first clutch provided between the first shaft and the second shaft; a second clutch provided between the fourth shaft and the fifth shaft; a third clutch provided between the first shaft and the fifth shaft; a first two-way clutch provided between the third shaft and the fifth shaft; a second two-way clutch provided between the third shaft and the fourth shaft; a first brake provided between the second shaft and the transmission casing; and a second brake provided between the fifth shaft and the transmission casing.

The first, the second, and the third rotating elements may be constituted by a first sun gear, a first carrier, and a first ring gear; the fourth, the fifth, and the sixth rotating elements may be constituted by a second sun gear, a second carrier, and a second ring gear; and the seventh, the eighth, and the ninth rotating elements may be constituted by a third sun gear, a third carrier, and a third ring gear.

Each of the first planetary gear set and the second planetary gear set may be constituted by a single pinion planetary gear set; the third planetary gear set may be constituted by a double pinion planetary gear set; and the first, second, and third planetary gear sets may be sequentially arranged from a first side toward a second side of the transmission housing.

Further, according to some aspect of the present disclosure, an automatic transmission for a vehicle may include: an input shaft and an output shaft arranged concentrically with each other; a first planetary gear set, a second planetary gear set, and a third planetary gear set, which are provided between the input shaft and the output shaft, and provided with respective three rotating elements; and seven coupling elements configured to variably provide a frictional force to the rotating elements of the first, second and third planetary gear sets, wherein a first rotating element of the first planetary gear set is selectively connected to a first rotating element of the second planetary gear set, a third rotating element of the second planetary gear set, and a second rotating element of the third planetary gear set respectively. A second rotating element of the first planetary gear set is selectively connected to the input shaft while being permanently or fixedly connected to a second rotating element of the second planetary gear set, and a third rotating element of the first planetary gear set is permanently or fixedly connected to the output shaft. In addition, a first rotating element of the second planetary gear set is permanently or fixedly connected to a third rotating element of the third planetary gear set and is selectively connected to a third rotating element of the second planetary gear set. A first rotating element of the third planetary gear set is permanently fixed to the transmission casing, and a second rotating element of the third planetary gear set is directly and fixedly connected to the input shaft.

Here, the term "fixedly connected" or the like means at least two members are connected to each other to always rotate together. Therefore, it is to be understood by a person of an ordinary skill in the art that the term "fixedly connected" or the like differs from the term "operably connected" or the like.

Each of the first planetary gear set and the second planetary gear set may be constituted by a single pinion planetary gear set; the third planetary gear set may be constituted by a double pinion planetary gear set; and the first, second, and third planetary gear sets may be arranged such that the first, the second, and the third planetary gear sets are sequentially arranged from respective first sides toward second sides.

The seven coupling elements may be constituted by a first clutch, a second clutch, a third clutch, a first brake, a second brake, a first two-way clutch, and a second two-way clutch. The first rotating element of the first planetary gear set may be selectively connected to the first rotating element of the second planetary gear set by the second clutch, may be selectively connected to the third rotating element of the second planetary gear set by the first two-way clutch, may be selectively connected to the second rotating element of the third planetary gear set by the third clutch, and may be selectively fixed to the transmission casing by the second brake. In addition, the second rotating element of the first planetary gear set may be selectively connected to the input shaft by the first clutch, and may be selectively fixed to the transmission casing by the first brake, and the first rotating element of the second planetary gear set may be selectively connected to the third rotating element by the second two-way clutch.

In the first planetary gear set, the first rotating element may be a first sun gear, the second rotating element may be a first carrier, and the third rotating element may be a first ring gear. In the second planetary gear set, the first rotating element may be a second sun gear, the second rotating element may be a second carrier, and the third rotating element may be a second ring gear. In one form, in the third planetary gear set, the first rotating element may be a third sun gear, the second rotating element may be a third carrier, and the third rotating element may be a third ring gear.

Further, according to some aspect of the present disclosure, there is provided an automatic transmission for a vehicle, the automatic transmission including: a first planetary gear set, a second planetary gear set, and a third planetary gear set provided with respective three rotating elements; seven coupling elements configured to variably provide a frictional force; and seven shafts connected to the rotating elements of the planetary gear sets. In particular, among the seven shafts, a first shaft is directly or fixedly connected to a second rotating element of the third planetary gear set and an input shaft; a third shaft is directly or fixedly connected to a third rotating element of the second planetary gear set; a fourth shaft is directly or fixedly connected to a first rotating element of the second planetary gear set and a third rotating element of the third planetary gear set; a sixth shaft is directly connected to a first rotating element of the third planetary gear set and a transmission casing; a seventh shaft is directly or fixedly connected to a third rotating element of the first planetary gear set and an output shaft; and remaining two shafts are fixedly provided in the transmission casing.

The two shafts fixedly provided in the transmission casing may be constituted by a second shaft and a fifth shaft, wherein the second shaft is directly or fixedly connected to a second rotating element of the first planetary gear set and a second rotating element of the second planetary gear set; and the fifth shaft is directly or fixedly connected to a first rotating element of the first planetary gear set.

The seven coupling elements includes: a first clutch provided between the first shaft and the second shaft; a second clutch provided between the fourth shaft and the fifth shaft; a third clutch provided between the first shaft and the fifth shaft; a first two-way clutch provided between the third shaft and the fifth shaft; a second two-way clutch provided between the third shaft and the fourth shaft; a first brake provided between the second shaft and the transmission casing; and a second brake provided between the fifth shaft and the transmission casing.

The first to third planetary gear sets may be arranged such that the first planetary gear set, the second planetary gear set, and the third planetary gear set are sequentially arranged along an axial direction of the input shaft and the output shaft.

The rotating elements of each of the first to the third planetary gear sets may be arranged such that the first rotating element, the second rotating element, and the third rotating element are sequentially arranged radially outward from a center of rotation of the respective planetary gear sets.

According to the automatic transmission for a vehicle configured as described above, it is advantageous in that ten forward and one reverse gear stages are provided to enable an engine to operate in a more efficient region over the entire travel region of a vehicle, thereby enhancing fuel efficiency of the vehicle, and a gear ratio that is more suitable for the driver's request is promptly provided to improve the drivability of the vehicle.

The present disclosure is further advantageous in that the number of components is minimized as much as possible to reduce the size and weight of the transmission, thereby improving vehicle mountability, reducing cost, and improving fuel economy of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figures 1, 2:
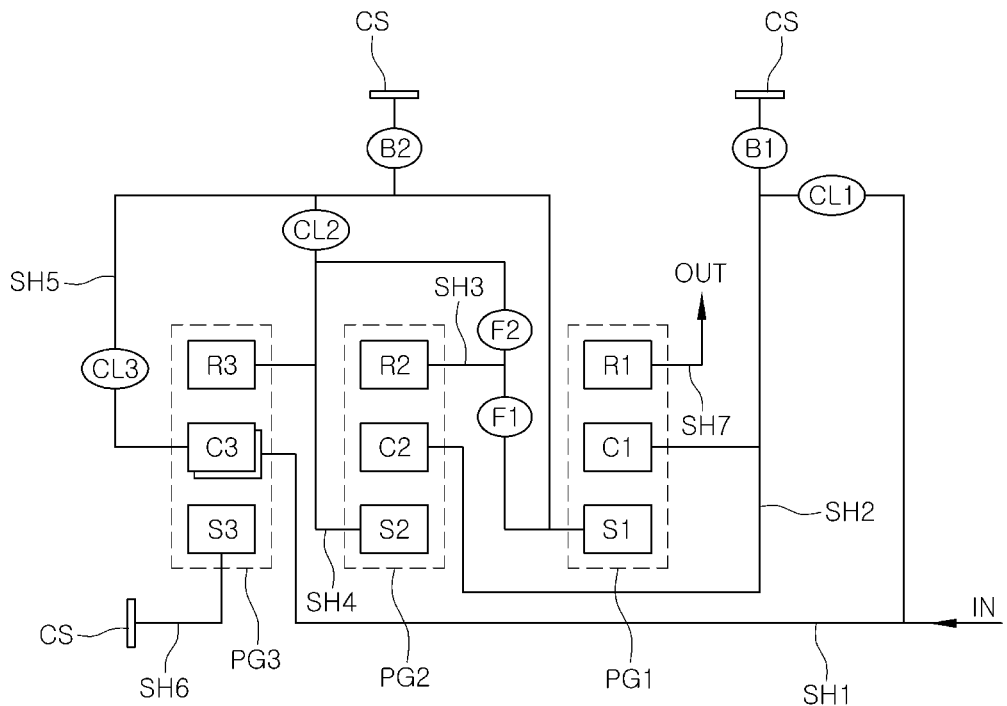
FIG. 1 is a view showing a configuration of an automatic transmission for a vehicle in one form of the present disclosure.
FIG. 2 is an operation mode table of the automatic transmission of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An automatic transmission for a vehicle according to an exemplary form of the present disclosure will be described in detail with reference to the accompanying drawings.

Referring to FIG. 1, an automatic transmission for a vehicle of the present disclosure includes: an input shaft IN receiving power; an output shaft OUT outputting power; a first planetary gear set PG1 having first, second, and third rotating elements; a second planetary gear set PG2 having fourth, fifth, and sixth rotating elements; a third planetary gear set PG3 having seventh, eighth, and ninth rotating elements; a first shaft SH1 connected to the eighth rotating element and the input shaft IN; a second shaft SH2 connected to the second rotating element and the fifth rotating element; a third shaft SH3 connected to the sixth rotating element; a fourth shaft SH4 connected to the fourth rotating element and the ninth rotating element; a fifth shaft SH5 connected to the first rotating element; a sixth shaft SH6 connected to the seventh rotating element; and a seventh shaft SH7 connected to the third rotating element and the output shaft OUT.

Each of the first planetary gear set PG1 and the second planetary gear set PG2 is constituted by a single pinion planetary gear set, the third planetary gear set PG3 is constituted by a double pinion planetary gear set, and the first, second, and third planetary gear sets PG3 are arranged such that the first, the second, and the third planetary gear sets are sequentially arranged from respective first sides toward second sides.

In other words, a power source such as an engine is supposed to supply power through the input shaft IN and first shaft SH1 by being always connected to the second rotating element of the third planetary gear set PG3, and after the supplied power is appropriately shifted through the present disclosure configured such that the first planetary gear set PG1, the second planetary gear set PG2, and the third planetary gear set PG3 are sequentially arranged, then the power is output to the output shaft OUT via the third rotating element of the first planetary gear set PG1 and the seventh shaft SH7.

The automatic transmission further includes seven coupling elements selectively connecting shafts (among the first shaft SH1 to the seventh shaft SH7) to each other, or selectively connecting a shaft and a transmission casing CS, wherein of the seven coupling elements, two coupling elements are controlled to be simultaneously operated, such that a predetermined gear stage of forward and reverse gear stages is implemented.

The seven coupling elements include: five clutches connecting two shafts among the first shaft SH1 to the seventh shaft SH7 together; and two brakes selectively connecting shafts selected among the first shaft SH1 to the seventh shaft SH7, without being connected to the input shaft IN or the output shaft OUT, to the transmission casing CS.

In other words, the seven coupling elements include: a first clutch CL1 provided between the first shaft SH1 and the second shaft SH2; a second clutch CL2 provided between the fourth shaft SH4 and the fifth shaft SH5; a third clutch CL3 provided between the first shaft SH1 and the fifth shaft SH5; a first two-way clutch F1 provided between the third shaft SH3 and the fifth shaft SH5; a second two-way clutch F2 provided between the third shaft SH3 and the fourth shaft SH4; a first brake B1 provided between the second shaft SH2 and the transmission casing CS; and a second brake B2 provided between the fifth shaft SH5 and the transmission casing CS.

The first planetary gear set PG1 to the third planetary gear set PG3, and the coupling elements are mounted in the transmission casing CS, wherein a torque converter may be provided between the power source and the input shaft IN, and the power output to the output shaft OUT may be supplied to the drive wheel of the vehicle through a differential that is not shown.

The first, the second, and the third rotating elements are constituted by a first sun gear S1, a first carrier C1, and a first ring gear R1; the fourth, the fifth, and the sixth rotating elements are constituted by a second sun gear S2, a second carrier C2, and a second ring gear R2; and the seventh, the eighth, and the ninth rotating elements are constituted by a third sun gear S3, a third carrier C3, and a third ring gear R3.

The automatic transmission for a vehicle of the present disclosure configured as described above implements gear stages according to the operation mode table of FIG. 2, and FIGS. 3 to 12 are lever diagrams showing a state where the automatic transmission implements first to tenth forward gear stages.

For reference, the first two-way clutch F1 and the second two-way clutch F2 are provided between an arbitrary first rotating body and an arbitrary second rotating body, respectively, to be capable of switching among: OWC1 state where power can be transmitted only from the first rotating body to the second rotating body, but not in the opposite direction; OWC2 state where power can be transmitted only from the second rotating body to the first rotating body, but not in the opposite direction; LOCK state where bidirectional rotation of the first rotating body and the second rotating body is constrained to be capable of transmitting power in both directions; and FREE state where the first rotating body and the second rotating body are disconnected from each other to be in capable of transmitting power in both directions, by an external operation force.

In FIG. 2, the first two-way clutch F1 and the second two-way clutch F2 are shown along with an operating state as described above, wherein in the case of the first two-way clutch F1, it is shown that the OWC1 state as a state where power can be transmitted only from the second ring gear R2 to the first sun gear S1, but not in the opposite direction, and in the case of the second two-way clutch F2, it is shown that the OWC1 state as a state where power can be transmitted from the second ring gear R2 to the second sun gear S2, but not in the opposite direction.

Figure 3:
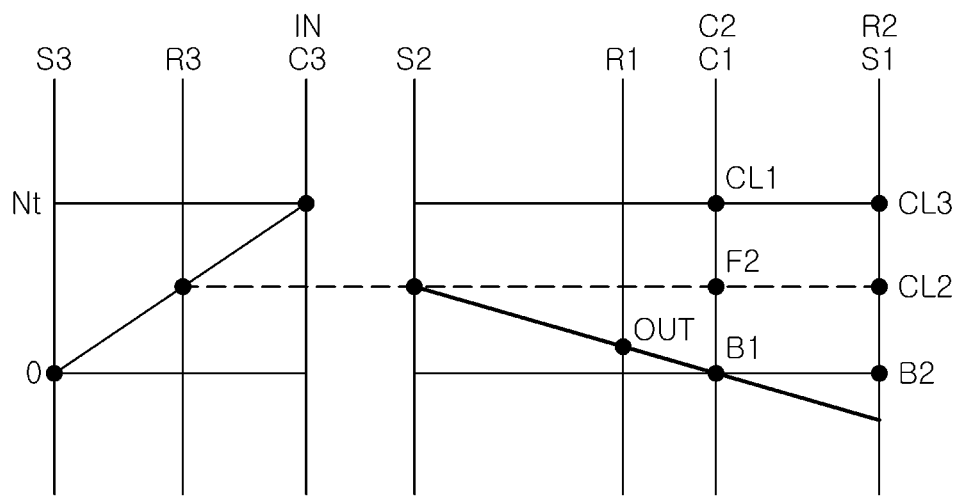
FIGS. 3 to 12 are lever diagrams showing a state where the automatic transmission of FIG. 1 implements first to tenth gear stages.
Figure 4:
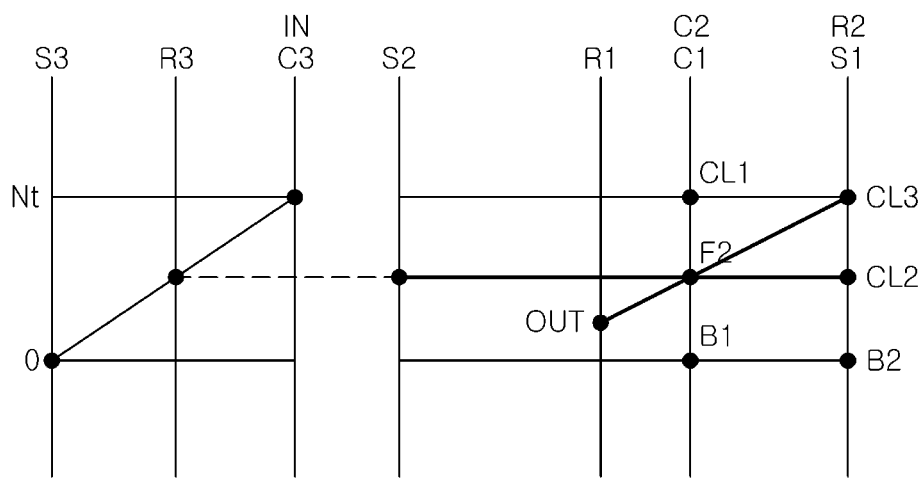
Figure 5:
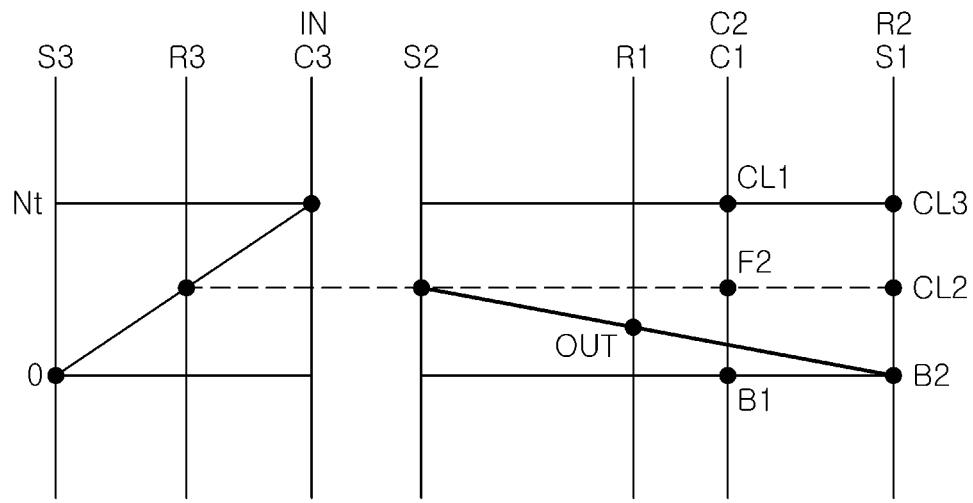
Figure 6:
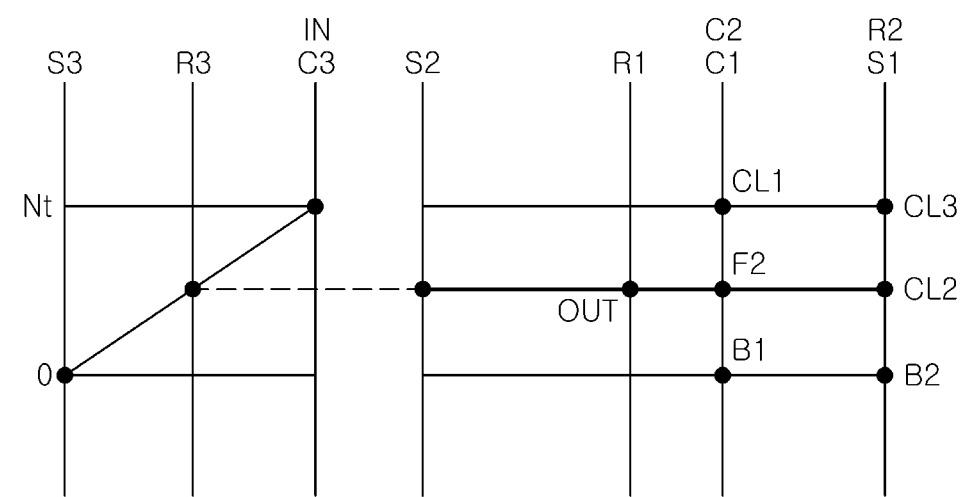
Figure 7:
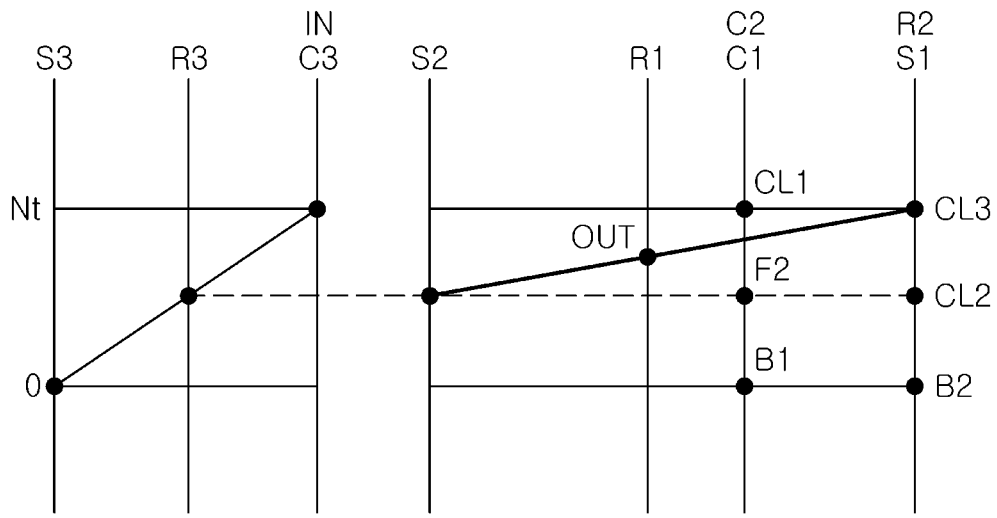
Figure 8:
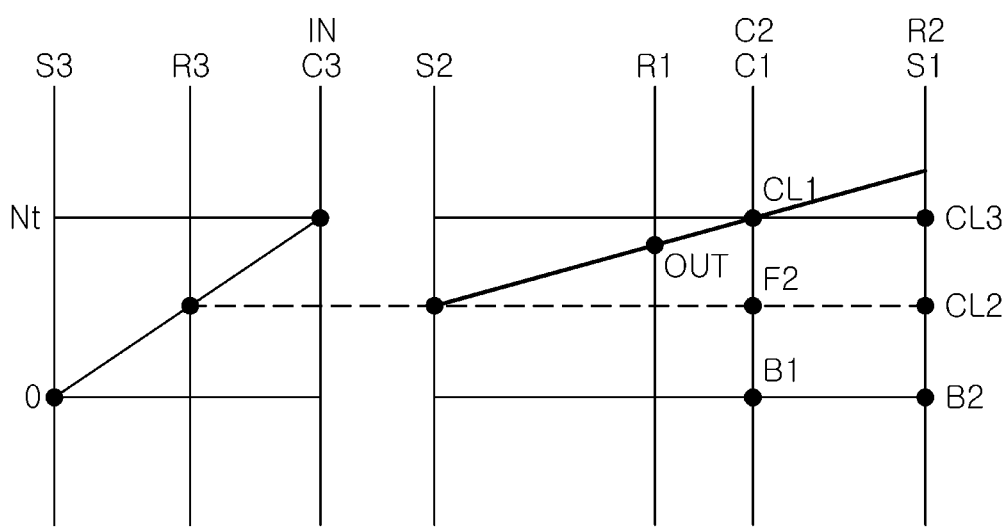
Figure 9:
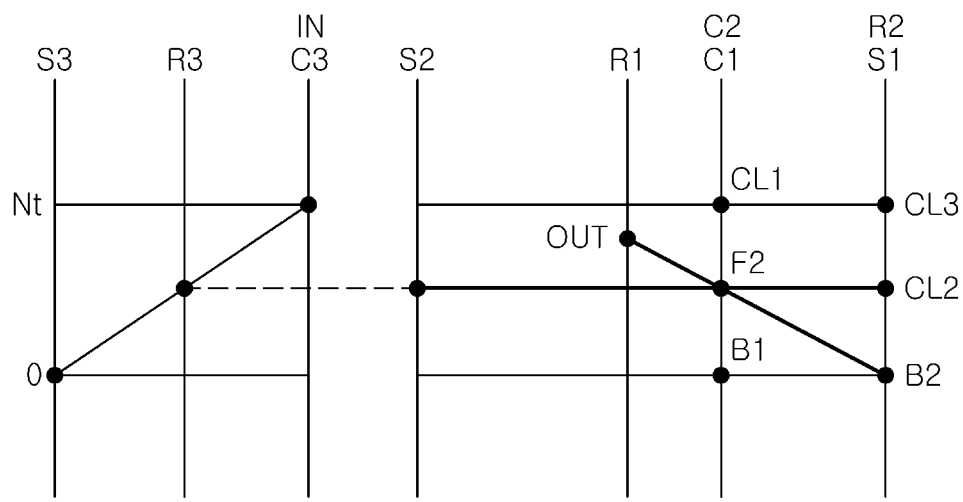
Figure 10:
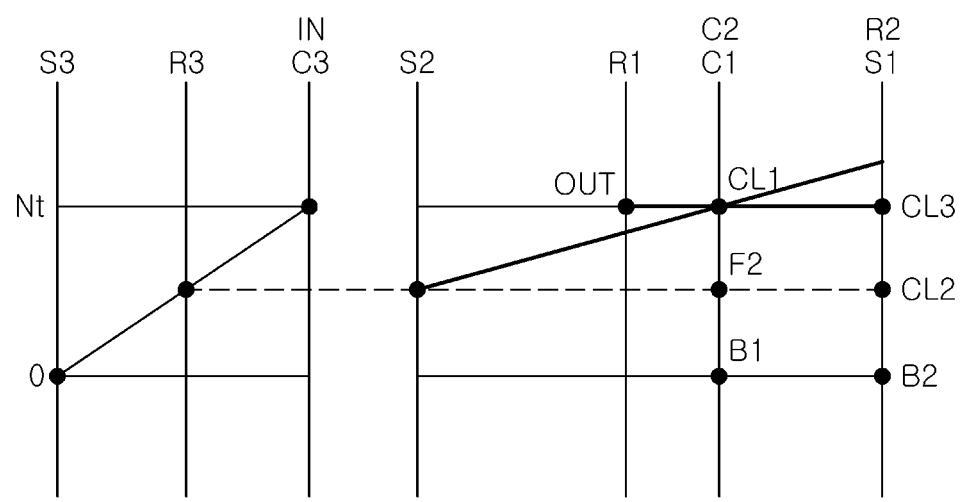
Figure 11:
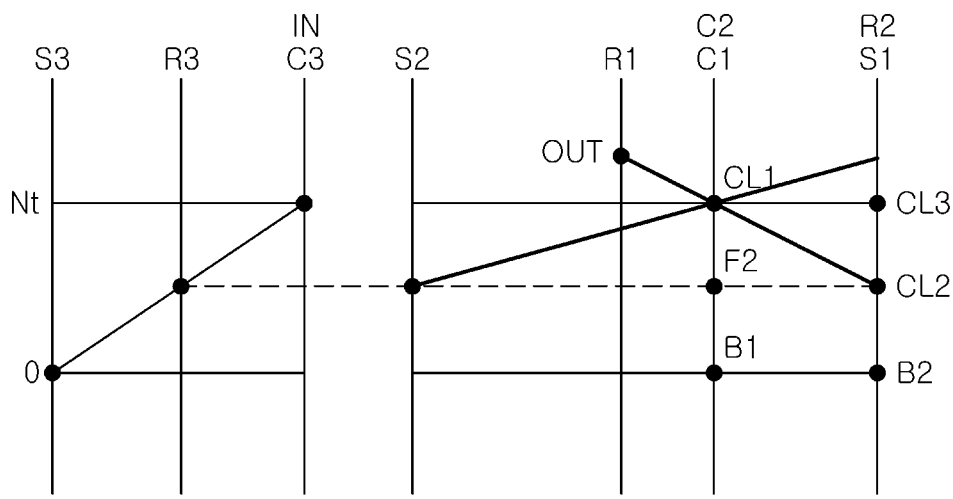
Figure 12:
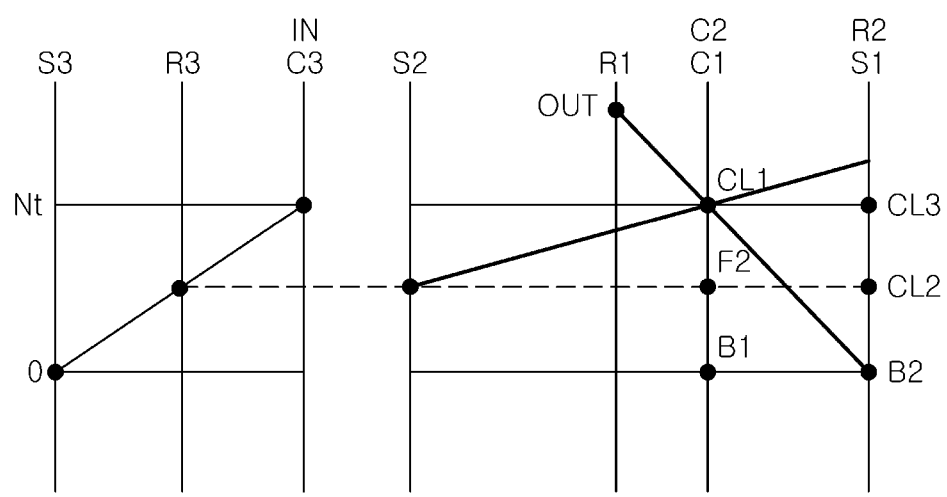

For reference, describing the lever diagram showing the state of forming the first gear stage of FIG. 3, the oblique line on the left side shows the configuration of the third planetary gear set PG3, wherein the third carrier C3 is connected to the input shaft IN and is receiving power, the first sun gear S1 is fixed and the speed is maintained at zero, and the third ring gear R3 is permanently or fixedly connected to the second sun gear S2 and is transmitting power to the second sun gear S2 of the second planetary gear set PG2.

The oblique line on the right side in FIG. 3 shows the configuration of the second planetary gear set PG2 and the configuration of the first planetary gear set PG1 superimposed thereon, wherein the first brake B1 is engaged and the first carrier C1 and the second carrier C2 are held at zero speed, and since the first two-way clutch F1 is in the LOCK state, the first sun gear S1 is constrained to the second ring gear R2 and is operated in conjunction therewith, whereby in the first ring gear R1 connected to the output shaft OUT, as shown in the drawing, a state is shown in which the first gear stage displayed at a position slightly higher than the zero speed is implemented.

Here, the second two-way clutch F2 is in the OWC1 state, that is, in the state where power can be transmitted only from the second ring gear R2 to the second sun gear S2, and prepares for the subsequent second gear stage.

In this state, since the second two-way clutch F2 cannot transmit power from the second sun gear S2 to the second ring gear R2, as shown in the drawing, the speed of the second sun gear S2 is allowed to be faster than the speed of the second ring gear R2.

FIGS. 4 to 12 are diagrams for explaining a state in which the respective gear stages are implemented according to the principle as shown in FIG. 3, and a detailed description thereof will be omitted.

Meanwhile, the present disclosure described above may be expressed as follows.

An automatic transmission for a vehicle of the present disclosure includes: an input shaft IN and an output shaft OUT arranged concentrically with each other; a first planetary gear set PG1, a second planetary gear set PG2, and a third planetary gear set PG3, which are provided between the input shaft IN and the output shaft OUT, and provided with respective three rotating elements; and seven coupling elements configured to variably provide a frictional force to the rotating elements of the planetary gear sets.

The first planetary gear set PG1 is configured such that a first rotating element thereof is selectively connected to a first rotating element of the second planetary gear set PG2, a third rotating element of the second planetary gear set PG2, and a second rotating element of the third planetary gear set PG3 respectively, and is selectively fixed to a transmission casing CS by one of the coupling elements, a second rotating element thereof is selectively connected to the input shaft IN while being permanently or fixedly connected to a second rotating element of the second planetary gear set PG2, and is selectively fixed to the transmission casing CS by another one of the coupling elements, and a third rotating element thereof is permanently or fixedly connected to the output shaft OUT.

The second planetary gear set PG2 is configured such that a first rotating element thereof is permanently or fixedly connected to a third rotating element of the third planetary gear set PG3 and is selectively connected to a third rotating element of the second planetary gear set PG2; and the third planetary gear set PG3 is configured such that a first rotating element thereof is fixed to the transmission casing CS, and a second rotating element thereof is directly connected to the input shaft IN.

Each of the first planetary gear set PG1 and the second planetary gear set PG2 is constituted by a single pinion planetary gear set; the third planetary gear set PG3 is constituted by a double pinion planetary gear set; and the first planetary gear set PG1, the second planetary gear set PG2, and the third planetary gear set PG3 are sequentially arranged from a first side toward a second side of the transmission housing.

The seven coupling elements are constituted by a first clutch CL1, a second clutch CL2, a third clutch CL3, a first brake B1, a second brake B2, a first two-way clutch F1, and a second two-way clutch F2, wherein the first rotating element of the first planetary gear set PG1 is connected to the first rotating element of the second planetary gear set PG2 by the second clutch CL2, is connected to the second rotating element of the second planetary gear set PG2 by the first two-way clutch F1, is connected to the second rotating element of the third planetary gear set PG3 by the third clutch CL3, and is selectively fixed to the transmission casing CS by the second brake B2.

Further, the second rotating element of the first planetary gear set PG1 is connected to the input shaft IN by the first clutch CL1, and is selectively fixed to the transmission casing CS by the first brake B1; and the first rotating element of the second planetary gear set PG2 is connected to the third rotating element by the second two-way clutch F2.

Herein, of the first planetary gear set PG1, the first rotating element is a first sun gear S1, the second rotating element is a first carrier C1, and the third rotating element is a first ring gear R1; of the second planetary gear set PG2, the first rotating element is a second sun gear S2, the second rotating element is a second carrier C2, and the third rotating element is a second ring gear R2; and of the third planetary gear set PG3, the first rotating element is a third sun gear S3, the second rotating element is a third carrier C3, the third rotating element is a third ring gear R3.

Further, the present disclosure described above may be expressed as follows.

In other words, an automatic transmission for a vehicle of the present disclosure includes: a first planetary gear set PG1, a second planetary gear set PG2, and a third planetary gear set PG3 provided with respective three rotating elements; seven coupling elements configured to variably provide a frictional force; and seven shafts connected to the rotating elements of the planetary gear sets, wherein, of the seven shafts, a first shaft SH1 is directly and fixedly connected to a second rotating element of the third planetary gear set PG3 and an input shaft IN; a third shaft SH3 is fixedly connected to a third rotating element of the second planetary gear set PG2; a fourth shaft SH4 is fixedly connected to a first rotating element of the second planetary gear set PG2 and a third rotating element of the third planetary gear set PG3; a sixth shaft SH6 is directly connected to a first rotating element of the third planetary gear set PG3 and a transmission casing CS; a seventh shaft SH7 is fixedly connected to a third rotating element of the first planetary gear set PG1 and an output shaft OUT; and the remaining two shafts are selectively fixed to the transmission casing CS.

Herein, the two shafts selectively fixed to the transmission casing CS are constituted by a second shaft SH2 and a fifth shaft SH5, wherein the second shaft SH2 is fixedly connected to a second rotating element of the first planetary gear set PG1 and a second rotating element of the second planetary gear set PG2; and the fifth shaft SH5 is fixedly connected to a first rotating element of the first planetary gear set PG1.

Of the seven coupling elements, a first clutch CL1 is provided between the first shaft SH1 and the second shaft SH2; a second clutch CL2 is provided between the fourth shaft SH4 and the fifth shaft SH5; a third clutch CL3 is provided between the first shaft SH1 and the fifth shaft SH5; a first two-way clutch F1 is provided between the third shaft SH3 and the fifth shaft SH5; a second two-way clutch F2 is provided between the third shaft SH3 and the fourth shaft SH4; a first brake B1 is provided between the second shaft SH2 and the transmission casing CS; and a second brake B2 is provided between the fifth shaft SH5 and the transmission casing CS.

The rotating elements of each of the first planetary gear set PG1 to the third planetary gear set PG3 are arranged such that the first rotating element, the second rotating element, and the third rotating element are sequentially arranged radially outward from a center of rotation of the corresponding planetary gear sets.

Although an exemplary form of the present disclosure has been described for illustrative purposes, those skilled in the art will appreciate that various modifications, additions and substitutions are possible, without departing from the scope and spirit of the present disclosure.

What is claimed is:

1. An automatic transmission for a vehicle, the automatic transmission comprising:
   an input shaft receiving power;
   an output shaft outputting power;
   a first planetary gear set including a first rotating element, a second rotating element, and a third rotating element;
   a second planetary gear set including a fourth rotating element, a fifth rotating element, and a sixth rotating element;
   a third planetary gear set including a seventh rotating element, an eighth rotating element, and a ninth rotating element;
   a first shaft connected to the eighth rotating element and the input shaft;
   a second shaft connected to the second rotating element and the fifth rotating element;
   a third shaft connected to the sixth rotating element;
   a fourth shaft connected to the fourth rotating element and the ninth rotating element;
   a fifth shaft connected to the first rotating element;
   a sixth shaft connected to the seventh rotating element; and
   a seventh shaft connected to the third rotating element and the output shaft,
   wherein:
      the first planetary gear set and the second planetary gear set are respectively a single pinion planetary gear set,
      the third planetary gear set is a double pinion planetary gear set, and
      the first, second, and third planetary gear sets are sequentially arranged from a first side toward a second side of the transmission housing.

2. The automatic transmission of claim 1, further comprising:
   seven coupling elements, each selectively connecting a pair of shafts among the first to the seventh shafts, or selectively connecting a shaft among the first to seventh shafts to a transmission casing,
   wherein two coupling elements of the seven coupling elements are controlled to be simultaneously operated, such that a predetermined gear stage is implemented.

3. The automatic transmission of claim 2, wherein the seven coupling elements include:
   five clutches, each connecting one of the pair of shafts of the first to the seventh shafts together; and
   two brakes, each selectively connecting one of the shafts among the first to the seventh shafts without being connected to the input shaft or the output shaft, with the transmission casing.

4. The automatic transmission of claim 2, wherein the seven coupling elements include:
   a first clutch provided between the first shaft and the second shaft;
   a second clutch provided between the fourth shaft and the fifth shaft;
   a third clutch provided between the first shaft and the fifth shaft;
   a first two-way clutch provided between the third shaft and the fifth shaft;
   a second two-way clutch provided between the third shaft and the fourth shaft;
   a first brake provided between the second shaft and the transmission casing; and
   a second brake provided between the fifth shaft and the transmission casing.

5. The automatic transmission of claim 1, wherein the first, the second, and the third rotating elements are respectively a first sun gear, a first carrier, and a first ring gear;
   the fourth, the fifth, and the sixth rotating elements are respectively a second sun gear, a second carrier, and a second ring gear; and
   the seventh, the eighth, and the ninth rotating elements are respectively a third sun gear, a third carrier, and a third ring gear.

6. An automatic transmission for a vehicle, the automatic transmission comprising:
   an input shaft and an output shaft arranged concentrically with each other;
   a first planetary gear set, a second planetary gear set, and a third planetary gear set, which are provided between the input shaft and the output shaft, and provided with respective three rotating elements; and
   seven coupling elements each configured to variably provide a frictional force to any one of the rotating elements of the first, second and third planetary gear sets,
   wherein a first rotating element of the first planetary gear set is selectively connected to a first rotating element of the second planetary gear set, a third rotating element of the second planetary gear set, and a second rotating element of the third planetary gear set respectively,
   wherein a second rotating element of the first planetary gear set is selectively connected to the input shaft while being fixedly connected to a second rotating element of the second planetary gear set,
   wherein a third rotating element of the first planetary gear set is fixedly connected to the output shaft,
   wherein the first rotating element of the second planetary gear set is fixedly connected to a third rotating element of the third planetary gear set and is selectively connected to a third rotating element of the second planetary gear set, and
   wherein a first rotating element of the third planetary gear set is fixed to the transmission casing, and the second rotating element of the third planetary gear set is fixedly and directly connected to the input shaft.

7. The automatic transmission of claim 6, wherein the first planetary gear set and the second planetary gear set are respectively a single pinion planetary gear set;
   the third planetary gear set is a double pinion planetary gear set; and
   the first, second, and third planetary gear sets are sequentially arranged from a first side toward a second side of the transmission housing.

8. The automatic transmission of claim 7, wherein the seven coupling elements are respectively a first clutch, a second clutch, a third clutch, a first brake, a second brake, a first two-way clutch, and a second two-way clutch,
   wherein the first rotating element of the first planetary gear set is selectively connected to the first rotating element of the second planetary gear set by the second clutch, is selectively connected to the third rotating element of the second planetary gear set by the first two-way clutch, is selectively connected to the second rotating element of the third planetary gear set by the third clutch, and is selectively fixed to the transmission casing by the second brake,
   wherein the second rotating element of the first planetary gear set is selectively connected to the input shaft by the first clutch, and is selectively fixed to the transmission casing by the first brake, and wherein the first rotating element of the second planetary gear set is selectively connected to the third rotating element by the second two-way clutch.

9. The automatic transmission of claim 8, wherein the first rotating element, the second rotating element and the third rotating element of the first planetary gear set are respectively a first sun gear, a first carrier, and a first ring gear, wherein the first rotating element, the second rotating element and the third rotating element of the second planetary gear set are respectively a second sun gear, a second carrier, and a second ring gear, and wherein the first rotating element, the second rotating element and the third rotating element of the third planetary gear set are respectively a third sun gear, a third carrier, and a third ring gear.

10. An automatic transmission for a vehicle, the automatic transmission comprising:

a first planetary gear set, a second planetary gear set, and a third planetary gear set each including three rotating elements;

seven coupling elements configured to each selectively connect a pair of shafts among first to seventh shafts, or selectively connect a shaft among the first to seventh shafts to a transmission casing;

a first shaft directly and fixedly connected to a second rotating element of the third planetary gear set and an input shaft;

a third shaft fixedly connected to a third rotating element of the second planetary gear set;

a fourth shaft fixedly connected to a first rotating element of the second planetary gear set and a third rotating element of the third planetary gear set;

a sixth shaft directly connected to a first rotating element of the third planetary gear set and the transmission casing;

a seventh shaft fixedly connected to a third rotating element of the first planetary gear set and an output shaft; and a second shaft, and a fifth shaft, each selectively fixed to the transmission housing, wherein:

the second shaft is fixedly connected to a second rotating element of the first planetary gear set and a second rotating element of the second planetary gear set, and the fifth shaft is fixedly connected to a first rotating element of the first planetary gear set.

11. The automatic transmission of claim 10, wherein the seven coupling elements comprises:

a first clutch provided between the first shaft and the second shaft;

a second clutch provided between the fourth shaft and the fifth shaft;

a third clutch provided between the first shaft and the fifth shaft;

a first two-way clutch provided between the third shaft and the fifth shaft;

a second two-way clutch provided between the third shaft and the fourth shaft;

a first brake provided between the second shaft and the transmission casing; and a second brake provided between the fifth shaft and the transmission casing.

12. The automatic transmission of claim 11, wherein the first planetary gear set, the second planetary gear set, and the third planetary gear set are sequentially arranged along an axial direction of the input shaft and the output shaft.

13. The automatic transmission of claim 11, wherein the first rotating element, the second rotating element, and the third rotating element of each of the first, second and third planetary gear sets are sequentially arranged radially outward from a center of rotation of the respective planetary gear sets.

* * * * *